(12) United States Patent
Wicks et al.

(10) Patent No.: US 6,545,588 B1
(45) Date of Patent: Apr. 8, 2003

(54) PAGER WITH ROTATING KNOB AND CHARACTER DISPLAY FOR INPUTTING MESSAGES

(75) Inventors: James E. Wicks, San Francisco, CA (US); Eduardo Sciammarella, Hoboken, NJ (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 905 days.

(21) Appl. No.: 08/808,870

(22) Filed: Feb. 28, 1997

(51) Int. Cl.$^7$ ................................................. G08B 5/22
(52) U.S. Cl. .................... 340/7.21; 340/7.25; 340/7.28; 340/7.48; 340/7.55; 340/825.56; 379/433.12; 379/358; 345/156; 341/35
(58) Field of Search ....................... 340/825.44, 825.56; 341/35; 345/156; 379/433

(56) References Cited

U.S. PATENT DOCUMENTS

| | | | |
|---|---|---|---|
| 3,976,995 A | 8/1976 | Sebestyen | 340/825.44 |
| 4,021,608 A | 5/1977 | Brodeur | 340/825.44 |
| 4,644,351 A * | 2/1987 | Zabarsky et al. | 340/825.44 |
| 4,646,081 A | 2/1987 | Tsunoda | 340/825.44 |
| 4,670,747 A | 6/1987 | Borras et al. | 340/825.56 |
| 5,694,120 A * | 12/1997 | Indekeu et al. | 340/825.44 |
| 5,754,645 A * | 5/1998 | Metroka et al. | 345/156 |

* cited by examiner

Primary Examiner—Brian Zimmerman
Assistant Examiner—Yves Dalencourt
(74) Attorney, Agent, or Firm—Rader, Fishman & Grauer PLLC; Ronald P. Kananen, Esq.

(57) ABSTRACT

A pager allows the input and transmission of a virtual unlimited range of messages. The pager comprises a character display control knob which controls the sequential display of alphabetic and numeric characters on a display. By rotating the knob, the displayed character advances or retreats through the appropriate alphabetic or numeric sequence. When the character is displayed that the pager user wishes to include in a message to be transmitted, the pager user presses a selection key. The process is repeated until the message is completed. The pager may then transmit the message to a paging system by radio transmission to a base station or by emitting a series of sounds in which the message is encoded. In the case of emitted sounds, the sounds are conveyed along an open phone line to the paging system where they are decoded.

27 Claims, 3 Drawing Sheets

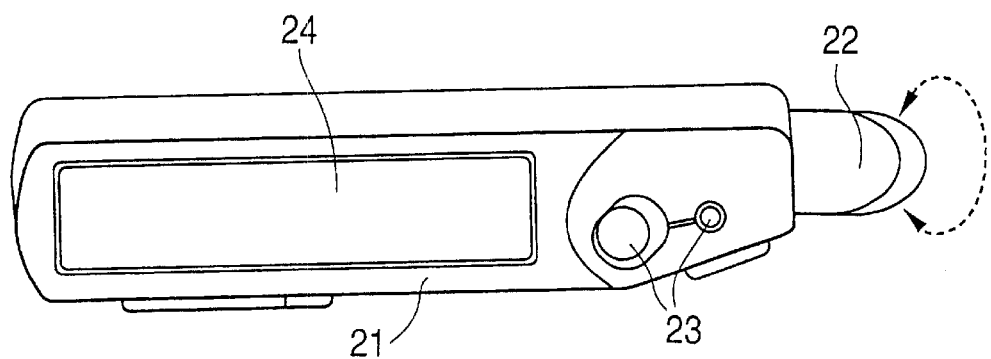
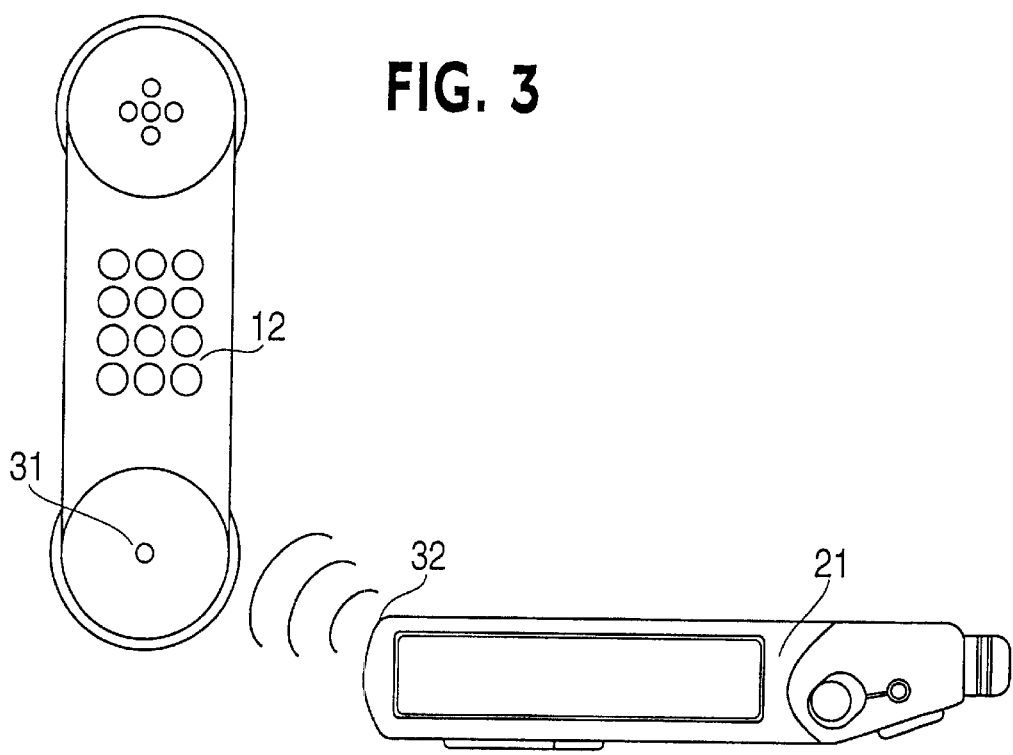

PAGER WITH ROTATING KNOB AND CHARACTER DISPLAY FOR INPUTTING MESSAGES

FIELD OF THE INVENTION

The present invention relates generally to the field of wireless pagers. More particularly, the present invention relates to a wireless pager which incorporates an alphabetically or numerically sequential display of characters, e.g. letters and numbers, controlled by some means, such as a rotating knob, as a means of inputting a message to be transmitted by the pager.

BACKGROUND OF THE INVENTION

Portable radio receivers and transceivers, such as wireless pagers, have become increasingly popular as a means of communication. Pagers are typically carried by users who wish or need to communicate when they are away from a telephone or computer, or are unable to predict where they may be reached at a given time.

In general, the user of a pager purchases the unit and enters into a contract with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but may have the capability to transmit data back to the system. This is referred to as two-way paging.

Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely than transmitting base stations 13 in order to receive the relatively weak transmissions broadcast by individual pagers 15. The receiving base stations 14 must be sufficient in number and distribution to receive pager transmissions originating anywhere in the service area.

With the advent of two-way paging, the pager user's ability to effectively communicate is limited only by the range of available messages the pager is capable of transmitting to the system. For example, to minimize equipment expense and power consumption, conventional two-way pagers may provide the pager user with a limited range of "multiple choice" responses to a page transmitted by the system. Alternatively, the pager may allow the pager user to initiate a transmission to the system from a limited list of pre-defined messages.

While more effective than merely receiving messages from the paging system, these methods obviously limit the pager user's ability to communicate. Accordingly, a need exists for a pager and paging system that provide the pager user with a much greater range of possible responses to a page or messages to be sent from the pager.

SUMMARY OF THE INVENTION

It is an object of the present invention to meet the above identified needs and others. Particularly, it is an object of the present invention to provide a pager which allows the pager user to input and transmit a virtually unlimited range of messages. It is a further object of the invention to allow the input of a wide range of messages using an electronic, sequential display of characters, e.g. letters, numbers and other characters, which is controlled by a rotating knob or the like.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a pager for entering and transmitting a message having: a display; at least one character displayed on the display; a character display control by which the at least one character displayed is changed; and a selection control which, when actuated, selects a character from among the at least one character displayed. The message comprises selected characters.

Under the principles of the present invention, the at least one character displayed may be a plurality of characters with one of the plurality being indicated as the character that will be selected when the selection control is actuated.

The character display control may be a rotatable knob which, when rotated, causes the at least one character displayed to change. The change of the at least one character may take place in alphabetic or numeric sequence; and in a direction of change within the sequence which is determined by the direction in which the knob is rotated.

Alternatively, the character display control may be at least one button which, when actuated, causes the at least one character displayed to change. The at least one button may be two buttons, and the direction of the change within the alphabetic or numeric sequence is determined by which of the two buttons is actuated.

As a third alternative, the character display control may be a switch which, when actuated, causes the at least one character displayed to change. The switch may be biased in an open position, but may be closed against one of two poles. The change of the at least one character takes place in alphabetic or numeric sequence in a direction determined by which of the two poles the switch is closed against.

In any event, the selected character may be displayed on the display. The pager of the present invention may also have a memory in which may be stored at least one identification number for a second pager to which a message is to be sent.

To send or transmit the message, the pager of the present invention may have an antenna by which the message may be transmitted to a paging system. The pager may also have a transmit control. In which case, the message is not transmitted to the paging system until the transmit control is actuated.

Alternatively, the pager of the present invention may have a speaker and an encoder which encodes the message in a series of sounds which are emitted by the speaker. Again, the sounds may not emitted by the speaker until a transmit control is actuated.

The present invention also encompasses a method of using a pager for entering and transmitting a message by: displaying at least one character on a display; changing the at least one character displayed with a character display control; selecting a character from among the at least one character displayed by actuating a selection control; and adding the selected character to the message.

The displaying at least one character may be performed by displaying a plurality of characters, and indicating one of the plurality of characters as being the character that will be selected in response to the actuation of the selection control.

Again, the character display control may be a rotatable knob, the changing being is caused by rotating the knob. If the changing of the at least one character takes place in alphabetic or numeric sequence, the method may also include determining a direction of the changing within the sequence in response to a direction in which the knob is rotated.

Also as before, the character display control may be at least one button, the changing being caused by actuating the at least one button. The at least one button may be two buttons. In which case, if the changing of the at least one character takes place in alphabetic or numeric sequence, the present method may also include determining a direction of the changing within the sequence in response to which of the two buttons is actuated.

Finally, as before, the character display control may be a switch, with the changing being caused by actuating the switch. In which case, the present method may include: biasing the switch in an open position; and closing the switch against one of two poles to cause the changing. If the changing takes place in alphabetic or numeric sequence, the present method may include determining the direction of the changing within the sequence in response to which of the two poles the switch is closed against.

In any event, the method may include displaying the selected character on the display; and storing in a memory at least one identification number for a second pager to which the message is to be sent.

In order to transmit the message, the present method may continue by: indicating an intended recipient of the message; and transmitting the message with an antenna to a paging system. The transmitting of the message may be performed in response to the actuation of a transmit control.

Alternatively, the present method may accomplish transmission of the message by indicating an intended recipient of the message; providing a speaker; encoding the message in a series of sounds which are emitted by the speaker; telephoning a paging system service provider with a telephone having a microphone; holding the speaker the microphone; emitting the series of sounds in response to the actuation of a transmit control; transducing the series of sounds with the microphone; transmitting the transduced series of sounds along a phone line to the service provider; decoding the series of sounds to reveal the message; and transmitting the message to the intended recipient.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 2 illustrates a pager according to the present invention.

FIG. 3 illustrates one means of using a pager according to the present invention to transmit a message.

DETAILED DESCRIPTION OF THE PREFERRED EMBODIMENT

Figure 1:
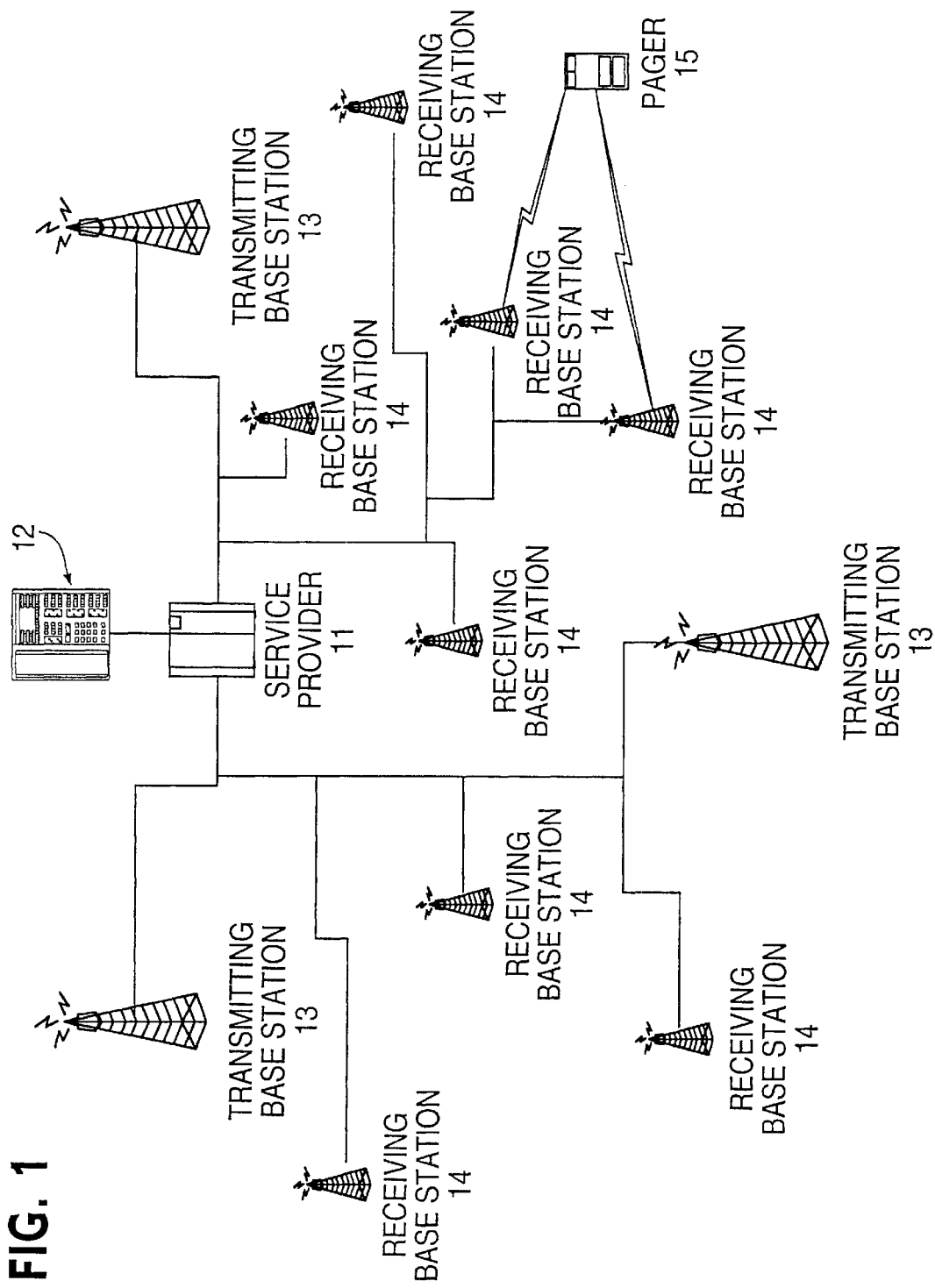
FIG. 1 is a schematic diagram of a two-way paging network with which a pager according to the present invention may be used.

Using the drawings, the preferred embodiment of the present invention will now be explained. As shown in FIG. 2, the pager 21 according to the principles of the present invention includes a display 24, input keys 23, including a selection key and a transmit key, and a character display control knob 22.

The letters of the alphabet and, preferably, digits 0 to 9 are sequentially displayed on display 24. The character display is preferably at the right end of the display 24 nearest the knob 22. As the display control knob 22 is rotated, the individual letter or number displayed on display 24 will change to the next or previous sequential letter or number in alphabetic or numeric sequence, respectively. Whether the display changes to the next or previous sequential character will depend on the direction in which knob 22 is rotated.

The knob 22 is rotated manually by the pager user. To facilitate such rotation, ridges or indentations may be axially provided around the periphery of the knob 22 to increase the friction between the knob 22 and a user's finger. It should also be noted that other mechanical or powered means of rotating knob 22 are within the scope of the invention, but are not viewed as cost-effective.

As will be described in more detail herein, the pager user can enter a message by rotating knob 22 until the first letter or number of the message appears on display 24. The pager user then presses the selection key, one of the input keys 23, to select that letter as part of the message to be sent.

This process is repeated with the second letter or number of the message, the third, and so on until the message is complete. The entered message is preferably displayed on the display 24 so that the pager user may see exactly what is to be transmitted.

Once the message has been entered, there are two methods by which the pager user can transmit the message. The method used will depend on whether the pager 21 is a one- or two-way pager.

If pager 21 is a one-way pager, the message may be transmitted by the method shown in FIG. 3. In this method, the pager user requires a telephone 12. Using telephone 12, the pager user calls the local paging system service provider (11 in FIG. 1) and identifies the pager to which the message is to be sent.

Pager 21 is provided with a speaker 32 on its rear or side surface. Once the pager user has contacted the service provider using telephone 12, the pager user can then hold the speaker 32 of pager 21 in close proximity to the microphone 31 of telephone 12.

Among the input keys 23, pager 21 is also provided with a transmit key. When the pager user presses the transmit key, pager 21 will emit a series of sounds through speaker 32 which will be transduced by microphone 31 and transmitted to the service provider. The service provider will then decode or translate the series of sounds into the message as entered by the pager user on pager 21.

As discussed earlier in reference to FIG. 1, when contacting the service provider 11 to send a message to a pager, the pager to which the message will be sent must be identified, typically by an identification number. In the present embodiment of the invention, the identification number of the pager which is to receive the message may be stated over the telephone or entered on the telephone keypad by the pager user before the input message is transmitted in the manner described.

Alternatively, to further automate the process, the recipient pager identification number may be entered at the beginning or end of the input message. The identification number is then transmitted to the service provider as described, i.e, through a series of sounds emitted by speaker 32, transduced by microphone 31 and translated by the service provider 11. Service provider 11 can then direct the message to the identified recipient.

Various methods for coding and decoding a series of sounds to convey the input message through the phone 12 to the service provider 11 are within the purview of one skilled in the art and are not detailed herein. Any such method may be used under the principles of the present invention.

Figure 4:
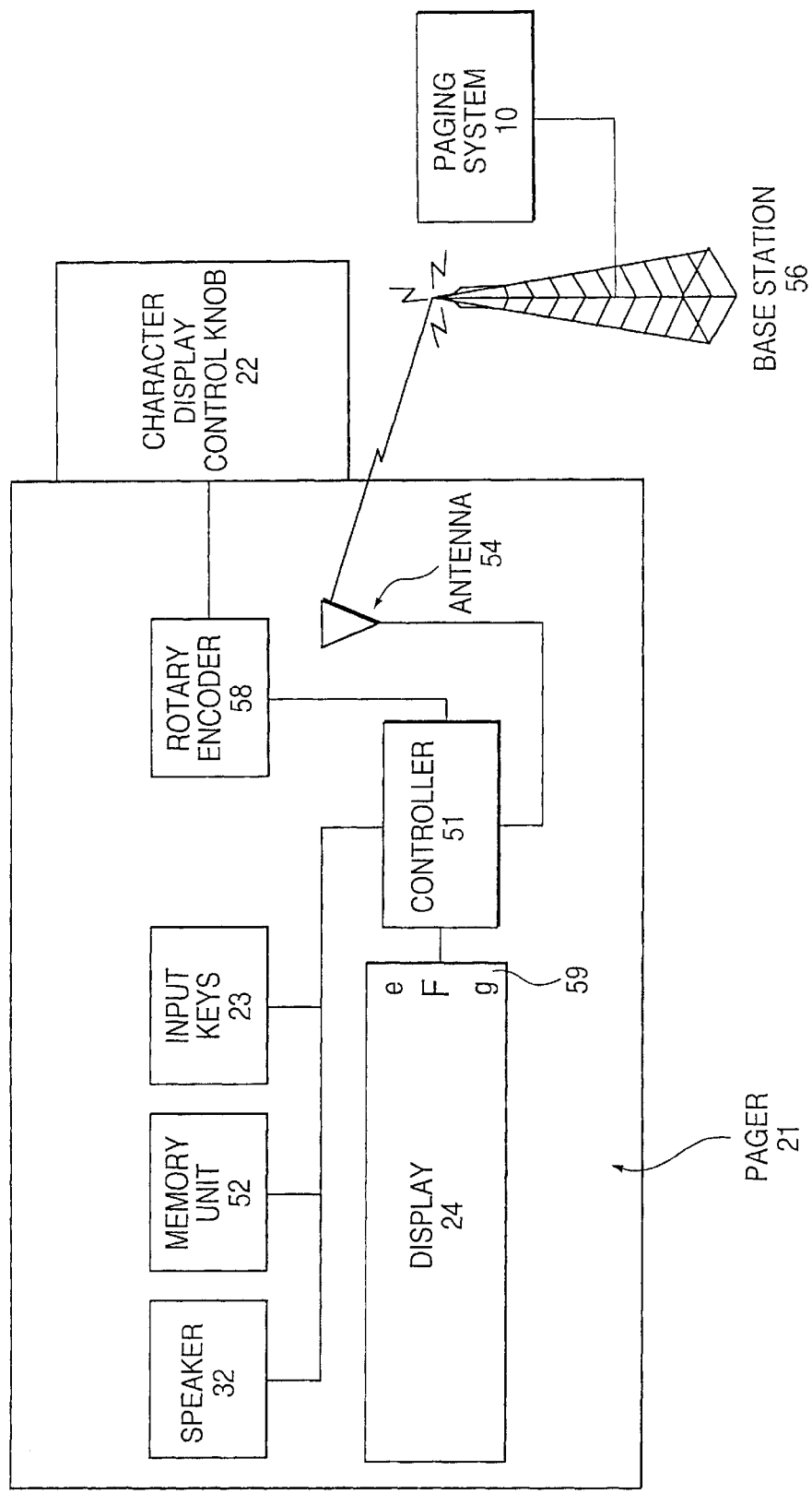
FIG. 4 is a block diagram of the key internal components of a pager according to the present invention.

Referring now to FIG. 4, the pager 21 must have a rotary encoder 58 which encodes the rotation of the knob 22. The encoder sends signals indicating the rotation of knob 22 to a controller 51. The controller then drives the display 24 to display, in sequence, the alphabetic, numeric and other characters. The direction of the sequential display will be determined by the direction in which the knob 22 is rotated as detected and indicated to the controller 51 by rotary encoder 58.

Only a single character of the sequence may be displayed at once. Alternatively, as shown in FIG. 4, the sequential character display 59 may show three characters in sequence at a time. The center character ("F" in FIG. 4) may be capitalized, rendered in boldface, or enlarged relative to the other displayed characters. If the selection key of input keys 23 is pressed, the center character in the display is the character that will be added to the message being input.

If the pager 21 is a two-way pager, after a message has been entered as described above, including the identification number of the recipient pager, the transmit key 23, is pressed. Controller 51 then transmits the message using antenna 54 to a nearby base station 56. The paging system 10 receives the message through base station 56 and transmits the message to the intended recipient's pager as shown in FIG. 1.

As shown in FIG. 4, the pager 21 of the present invention may embody both speaker 32 for transmitting messages in a one-way paging system and antenna 54 for transmitting messages in a two-way paging system. While these means for using both disparate methods of transmitting messages may be included for the sake of versatility in a single pager, only one is necessary to practice the present invention.

In either a one- or two-way paging system, the pager 21 may include a memory unit 52. Memory unit 52 may be used to store identification numbers of pagers to which messages are frequently sent. With memory unit 52, the pager user can use input keys 23 to direct the controller to access and display the identification numbers stored in memory 52. The pager user may then select a number from those displayed as the identification number of the pager to which the message will be sent. Thus, the pager user need not continually re-enter the identification number each time a message is sent to that recipient.

Finally, it should be recognized that alternative devices for controlling the sequential character display could be used and would function equivalently to the knob 22 of the preferred embodiment. For example, two buttons may be provided on pager 21 such that each time one of the buttons is pressed, the character displayed on the display 24 advances sequentially by one character. To move in the opposite direction of the character sequence, the other of the two buttons is pressed. To move rapidly through the character sequence in either direction, the pager user may press and hold one of the two buttons. The displayed movement through the sequence of characters stops when the button is released.

Alternatively, a switch may be provided, perhaps in the form of a knob similar to knob 22, that when moved in one of two directions closes a circuit and advances the sequential character display by one character closing the switch in the alternate direction would sequentially decrement the character or characters being displayed.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A pager for entering and transmitting a message comprising:

a display;

at least one character displayed on said display;

a character display control by which the said at least one character displayed is changed;

a selection control which, when actuated, selects a character from among the at least one character displayed;

an electronic controller for storing selected characters and a sequence in which said selected characters are selected, wherein said message comprises selected characters, and said sequence of selected characters is associated by said controller with a recipient identifier, said controller converts said recipient identifier and said sequence of selected characters into an electronic signal; and a transmitter which receives said electronic signal from said controller and transmits said signal to a paging system, wherein said at least one character displayed is a plurality of characters in alphanumeric order with one of said plurality being indicated as the character that will be selected when said selection control is actuated.

2. A pager as claimed in claim 1, wherein said character display control is a rotatable knob which, when rotated, causes said at least one character displayed to change.

3. A pager as claimed in claim 2, wherein said change of said at least one character takes place in alphabetic or numeric sequence; and a direction of change within said sequence is determined by a direction in which said knob is rotated.

4. A pager as claimed in claim 1, wherein said character display control is at least one button which, when actuated, causes said at least one character displayed to change.

5. A pager as claimed in claim 4, wherein:
said at least one button is two buttons;
said change of said at least one character takes place in alphabetic or numeric sequence; and
a direction of said change within said sequence is determined by which of said two buttons is actuated.

6. A pager as claimed in claim 1, wherein said character display control is a switch which, when actuated, causes said at least one character displayed to change.

7. A pager as claimed in claim 6, wherein:
said switch is biased in an open position, but may be closed against one of two poles;
said change of said at least one character takes place in alphabetic or numeric sequence; and
a direction of said change within said sequence is determined by which of said two poles said switch is closed against.

8. A pager as claimed in claim 1, wherein said sequence of selected characters is displayed on said display.

9. A pager as claimed in claim 1, further comprising a memory in which is stored at least one identification number for a second pager to which said message is to be sent which can be accessed by said controller and used by said controller as said recipient identifier.

10. A pager as claimed in claim 1, wherein said transmitter comprises an antenna by which said message is transmitted to a paging system.

11. A pager as claimed in claim 10, further comprising a transmit control, wherein said message is not transmitted to said paging system until said transmit control is actuated.

12. A pager for entering and transmitting a message comprising:
a display;
at least one character displayed on said display;
a character display control by which the said at least one character displayed is changed;
a selection control which, when actuated, selects a character from among the at least one character displayed;
an electronic controller for storing selected characters and a sequence in which said selected characters are selected, wherein said message comprises selected characters, and said sequence of selected characters is associated by said controller with a recipient identifier, said controller converts said recipient identifier and said sequence of selected characters into an electronic signal; and
a transmitter which receives said electronic signal from said controller and transmits said signal to a paging system wherein said transmitter comprises:
a speaker; and
an encoder which encodes said message in a series of sounds which are emitted by said speaker.

13. A pager as claimed in claim 12, further comprising a transmit control, wherein said sounds are not emitted by said speaker until said transmit control is actuated.

14. A method of using a pager for entering and transmitting a message comprising:
displaying at least one character on a display;
changing the at least one character displayed with a character display control;
selecting a character from among the least one character displayed by actuating a selection control;
storing selected characters and a sequence in which said selected characters are selected with an electronic controller;
associating said sequence of selected characters with a recipient identifier;
converting said recipient identifier and said sequence of selected characters into an electronic signal with said controller; and
transmitting said electronic signal to a paging system with a transmitter which receives said electronic signal from said controller, and further comprising:
indicating an intended recipient of said mesage with an input device which communicates with said controller to provide said recipient identifier; and
transmitting said message with an antena to said paging system.

15. A method as claimed in claim 14, wherein said displaying at least one character comprises:
displaying a plurality of characters; and
indicating one of said plurality of characters as being the character that will be selected in response to the actuation of said selection control.

16. A method as claimed in claim 14, wherein said character display control is a rotatable knob, and said changing is caused by rotating said knob.

17. A method as claimed in claim 16, wherein said changing of said at least one character takes place in alphabetic or numeric sequence; and said method further comprises determining a direction of said changing within said sequence in response to a direction in which said knob is rotated.

18. A method as claimed in claim 14, wherein said character display control is at least one button, and said changing is caused by actuating said at least one button.

19. A method as claimed in claim 18, wherein:
said at least one button is two buttons;
said changing comprises changing said at least one character in alphabetic or numeric sequence; and
said method further comprises determining a direction of said changing within said sequence in response to which of said two buttons is actuated.

20. A method as claimed in claim 14, wherein said character display control is a switch, and said changing is caused by actuating said switch.

21. A method as claimed in claim 20, further comprising:
biasing said switch in an open position; and
closing said switch against one of two poles to cause said changing.

22. A method as claimed in claim 21, wherein said changing of said at least one character takes place in alphabetic or numeric sequence, and said method further comprises determining a direction of said changing within said sequence in response to which of said two poles said switch is closed against.

23. A method as claimed in claim 14, further comprising displaying said sequence of selected characters on said display.

24. A method as claimed in claim 15, further comprising:
storing in a memory at least one identification number for a second pager to which said message is to be sent;
accessing said memory with said controller; and
using said at least one identification number as said recipient identifier.

25. A method as claimed in claim 15, further comprising transmitting said message in response to the actuation of a transmit control.

26. A method as claimed in claim 15, further comprising:

indicating an intended recipient of said message to provide said recipient identifier;

providing a speaker;

encoding said message in a series of sounds which are emitted by said speaker.

27. A method as claimed in claim 26, further comprising:

telephoning a paging system service provider with a telephone having a microphone;

holding said speaker said microphone;

emitting said series of sounds in response to the actuation of a transmit control;

transducing said series of sounds with said microphone;

transmitting said transduced series of sounds along a phone line to said service provider;

decoding said series of sounds to reveal said message; and transmitting said message to said intended recipient.

\* \* \* \* \*